United States Patent
Khakpour et al.

(10) Patent No.: US 9,787,579 B2
(45) Date of Patent: Oct. 10, 2017

(54) APPLICATION CONTROLLED PATH SELECTION BASED ON TYPE-OF-SERVICE

(71) Applicant: Verizon Digital Media Services Inc., Playa Vista, CA (US)

(72) Inventors: Amir Reza Khakpour, Santa Monica, CA (US); Alexander A. Kazerani, Santa Monica, CA (US); Robert J. Peters, Santa Monica, CA (US); Derek Shiell, Los Angeles, CA (US)

(73) Assignee: Verizon Digital Media Services Inc., Los Angeles, CA (US)

( * ) Notice: Subject to any disclaimer, the term of this patent is extended or adjusted under 35 U.S.C. 154(b) by 108 days.

(21) Appl. No.: 14/816,868

(22) Filed: Aug. 3, 2015

(65) Prior Publication Data

US 2016/0294681 A1  Oct. 6, 2016

Related U.S. Application Data

(63) Continuation-in-part of application No. 14/679,266, filed on Apr. 6, 2015.

(51) Int. Cl.
*H04L 12/28* (2006.01)
*H04L 12/725* (2013.01)
*H04L 12/741* (2013.01)
*H04L 12/715* (2013.01)
*H04L 12/707* (2013.01)

(52) U.S. Cl.
CPC ............ *H04L 45/306* (2013.01); *H04L 45/04* (2013.01); *H04L 45/22* (2013.01); *H04L 45/308* (2013.01); *H04L 45/74* (2013.01)

(58) Field of Classification Search
CPC ....... H04L 45/306; H04L 45/02; H04L 45/74; H04L 12/66; H04L 45/22; H04L 45/04; H04L 45/308
USPC .......................................................... 370/392
See application file for complete search history.

(56) References Cited

U.S. PATENT DOCUMENTS 8,111,649 B1 * 2/2012 Agarwall ................ H04L 12/00
   370/328
2006/0039335 A1 * 2/2006 Ono ...................... H04W 92/02
   370/338

(Continued)

*Primary Examiner* — Mang Yeung
(74) *Attorney, Agent, or Firm* — Los Angeles Patent Group; Arman Katiraei

(57) ABSTRACT

Some embodiments override network or router level path selection with application or server controlled path selection by repurposing the type-of-service (ToS) or differentiated services header field. A mapping table maps different ToS values to different available transit provider paths to a particular destination. A server generating a packet to the destination selects one of the available paths according to any of load balanced, failover, or performance optimization criteria. The server sets the packet header ToS field with the value assigned to the selected path. A router operating in the same network as the server is configured with policy based routing rules that similarly map the ToS values to different transit provider paths to the particular destination network. Upon receiving the server generated packet, the router routes the packet to the destination network through the transit provider path identified in the packet header by the server set ToS value.

19 Claims, 7 Drawing Sheets

(56) References Cited

U.S. PATENT DOCUMENTS

| | | |
|---|---|---|
| 2006/0050719 A1* | 3/2006 | Barr ................... H04L 12/4641 |
| | | 370/401 |
| 2006/0114916 A1 | 6/2006 | Vasseur |
| 2006/0268747 A1* | 11/2006 | van Haalen ........... H04L 12/462 |
| | | 370/256 |
| 2009/0190481 A1* | 7/2009 | Kobayashi ............. H04L 45/02 |
| | | 370/248 |
| 2011/0080911 A1 | 4/2011 | Gouchard |
| 2011/0249659 A1 | 10/2011 | Fontaine |
| 2012/0023178 A1 | 1/2012 | Drevon |
| 2014/0195686 A1 | 7/2014 | Yeager |
| 2014/0204755 A1* | 7/2014 | Liu ...................... H04W 28/24 |
| | | 370/235 |
| 2016/0248663 A1 | 8/2016 | Patel |
| 2016/0294672 A1 | 10/2016 | Sella |

* cited by examiner

APPLICATION CONTROLLED PATH SELECTION BASED ON TYPE-OF-SERVICE

CLAIM OF BENEFIT TO RELATED APPLICATIONS

This application is a continuation-in-part of U.S. nonprovisional application Ser. No. 14/679,266 entitled "Application Controlled Path Selection Over Different Transit Providers", filed Apr. 6, 2015. The contents of application Ser. No. 14/679,266 are hereby incorporated by reference.

BACKGROUND INFORMATION

Transit providers interconnect the networks that collectively form the Internet by providing the paths that allow one network to directly or indirectly exchange traffic with other networks. To provide a path, a transit provider typically operates a set of routers or network circuits that connect and allow for intercommunication between one network and another. A transit provider typically operates the routers along its paths, although the transit provider may sometimes leverage routers of other transit providers to complete a path, whereby relationships between the transit providers allow them to pass traffic on one another's routers or circuits. Some transit providers include NTT Communications, Tata Communications, Telefonica, TeliaSonera, and Verizon.

The term "path" can be defined to be any arbitrary set of network hops including routers or circuits under control of a common transit provider through which a source operating within a first network can reach a destination operating within a second network. When different packets are sent from the source to the destination through a transit provider path, the packets can traverse different sets of routers or circuits that are under control of the transit provider.

The term "transit" refers to a specific path or a specific set of network hops (i.e., routers or circuits) under control of a common transit provider through which the source operating within the first network can reach the destination operating within the second network. In other words, when different packets are sent from the source to the destination through a specific transit, the packets traverse the same hops or the same set or routers and circuits. The terms transit and path will be used interchangeably in the following disclosure.

Network operators including, for example, content delivery networks (CDNs), cloud service providers, and other content providers, establish peering relationships with two or more transit providers so that they have multiple paths through which they can pass messaging to a destination. The multiple paths provide the content provider with failover options in the event that the path of one transit provider fails or performance along that path is degraded. For instance, if a content provider is unable to reach a destination through a first transit provider's path, the content provider can transition to a second transit provider's path in order to reach the destination through the alternate path.

Routers, by operation of the Border Gateway Protocol (BGP), control path selection for traffic that exits one network and is intended for another external network. Therefore, in standard network routing, path selection is obfuscated from and not available at the application or server level. Consequently, servers operating behind the router have no control over which of several available paths the router will pass server generated traffic.

A BGP compliant router performs path selection based on route advertisements it receives from neighboring BGP compliant routers. Although the BGP compliant router may be aware of different transit provider paths to a given destination, the BGP router usually selects the same path that it believes to be the optimal path to the destination based on the received advertisements. The BGP router may not deviate from the optimal path until that path fails or is no longer available.

There are several disadvantages to this standard BGP method of operation. First, BGP path selection can lead to unbalanced utilization of the available paths. One path can receive heavy traffic load, thereby causing that path to become congested and ultimately underperform relative to other unused and underutilized paths. Second, the BGP update messages do not advertise performance metrics so as to identify path performance from one endpoint to another. Instead, the BGP update messages identify the number of hops or routers separating a source network from a destination network. As a result, the BGP selected path, although containing fewer hops, may actually provide worse performance (e.g., greater latency, more packet loss, etc.) than another available path. Third, BGP may be unable or slow to respond to certain failures. Since a BGP router receives advertisements from only its neighboring routers, it may take time for a router failure at one end of a path to propagate through to all other routers along the path. In the meantime, BGP routers can route traffic along the failing path with that traffic ultimately being undelivered to its intended destination. Stated differently, a BGP router does not know the full end-to-end connectivity of a path, and therefore, may be slow to respond to any problems occurring to routers that are not direct neighbors.

Content provider and CDN servers already perform various optimizations to improve content delivery. It is therefore desirable to enable another manner of content delivery optimization by routing traffic to a destination through one of several available paths that the server determines and chooses to be optimal. This would allow the server more direct control in responding to path failures and optimizing all aspects of its content delivery. Accordingly, there is a need to provide path selection control at the application or server level rather than at the network or router level. In providing application or server controlled path selection, there is a need to override standard networking protocols and router operation without disabling existing protocol functionality and router operation. In other words, application or server controlled path selection should be provided without compromising compatibility with existing networking protocols and interoperability with existing routers.

BRIEF DESCRIPTION OF THE DRAWINGS

A preferred embodiment of methods and systems for application controlled path selection through different transit providers will now be described, by way of example only, with reference to the accompanying drawings in which.

DETAILED DESCRIPTION OF PREFERRED EMBODIMENTS

Some embodiments provide methods and systems enabling a server to select one of several available transit provider paths for sending the server's generated traffic to a destination in an external network. The embodiments further enable the server to failover to different paths when one path becomes unavailable or underperforming. Accordingly, the provided embodiments move the task of selecting between different available transit provider paths from the network or router level to the application or server level. The embodiments override transit provider path selection Border Gateway Protocol (BGP) operations of a router without modifying BGP. More generally, the provided embodiments override standard networking protocols and router operation without disabling existing protocol functionality and router operation.

As a result of the provided embodiments, servers are no longer directly reliant on network routers to resolve some issues that occur at the network level. The servers now have a proactive means for directly combating network issues. Specifically, if a server identifies packet loss or significant network delay occurring on a first transit provider path, the server can autonomously switch to a second transit provider path and resend the packets to resolve the issues.

Some embodiments repurpose the packet header type-of-service (ToS) field for selecting between different transit provider paths through which a first machine (i.e., server) in a source network sends packets, content, services, or other messaging to a different second machine operating in a different destination network, wherein the source network is addressable with a different address prefix or subnet than the destination network and an exterior gateway protocol routes is used to route traffic between the networks. In preferred embodiments, the ToS field is the differentiated services field (DS field) within the Internet Protocol (IP). More specifically, references herein to setting the ToS value include setting a value of the six bit differentiated services code point (DSCP) of the DS field.

Figure 1:
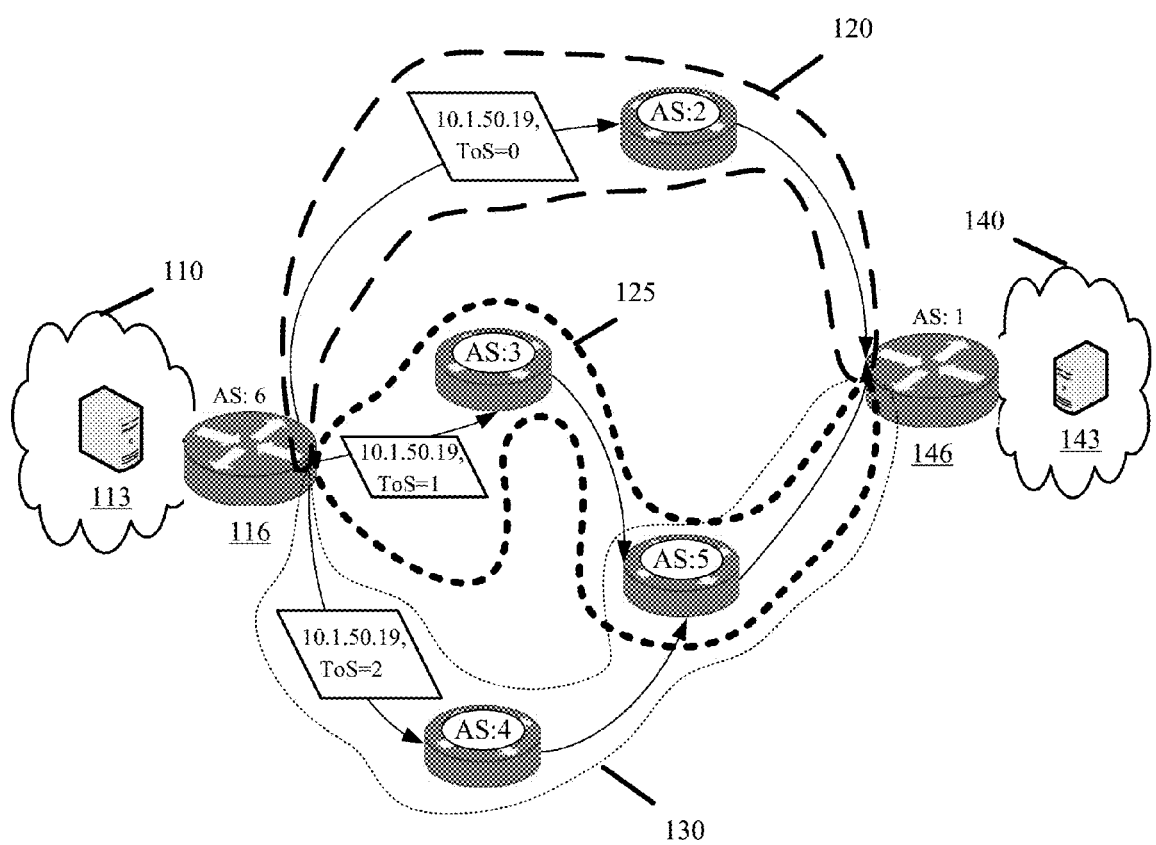
FIG. 1 conceptually illustrates repurposing the type-of-service header field for application or server level transit provider path selection in accordance with some embodiments.

In accordance with some embodiments, FIG. 1 conceptually illustrates repurposing the ToS field for application or server level transit provider path selection in accordance with some embodiments. The embodiments presented in FIG. 1 implement application or server level transit provider path selection in a manner that overrides network or router level transit provider path selection without compromising compatibility and interoperability with existing network protocols and router operation.

FIG. 1 depicts a source network 110 with at least one server 113 and a router 116, several transit provider paths 120, 125, and 130 connecting the source network 110 to a destination network 140 with at least one server 143 and a router 146. The two networks 110 and 140 can be first and second autonomous systems, first and second points-of-presence (PoPs) of a content delivery network (CDN), a CDN PoP and a content provider customer origin network, and any other networks that are reachable by way of an exterior gateway protocol.

The source network router 116 acts as the point of ingress for all packets coming from an external network and that are directed to the source network server 113 or any other machine in the source network 110. The source network router 116 also acts as the point of egress for all packets sent from the source network server 113 to any destination that is outside the source network 110. The destination network router 146 performs a similar role for packets entering and existing the destination network 140.

The transit provider paths 120, 125, and 130 traverse different autonomous systems (AS's) in connecting the source network 110 to the destination network 140. Each path 120, 125, and 130 involves a specific or arbitrary traversal of network hops (i.e., routers or circuits) that are under control of a single transit provider or that the single transit provider is permitted to use in passing traffic between the two networks. The transit provider paths 120, 125, and 130 may be operated by the same or different transit providers.

To implement application controlled path selection in accordance with the embodiments disclosed herein, the source network router 116 is configured to send any packet addressed to a destination in the destination network 140 through the first transit provider path 120 when the packet header specifies a ToS value (i.e., IP header DSCP value) of 0 or the ToS field is not set, through the second transit provider path 125 when the packet header specifies a ToS value of 1, and through the third transit provider path 130 when the packet header specifies a ToS value of 2. In this figure, the first transit provider path 120 is designated as the default path since the first transit provider path 120 is selected when the ToS value is not set or is set with a default of 0. However, it should be apparent that any of the other paths (e.g., 125 or 130) could alternatively be configured as the default path that is selected when the ToS value is not set or has a default value of 0.

The source network server 113 is similarly configured so as to take advantage of the router's ToS value to transit provider path mapping. To implement the application controlled path selection in accordance with the embodiments disclosed herein, the source network server 113 first selects which of the available paths 120, 125, and 130 to use in sending a first packet to the destination network. The selection is based on some path selection criteria configured on the source network server 113. The source network server 113 identifies the ToS value that is mapped to the selected path, wherein the mapping mirrors the mapping that is configured on the source network router 116. In this figure, the source network server 113 selects the first path 120 for sending the first packet to the destination network 140. Accordingly, when generating the first packet, the source network server 113 sets the packet header ToS field to a value of 0. Based on the first packet header ToS value of 0, the source network router 116 routes the first packet to the destination network 110 through the first transit provider path 120.

The source network server 113 may at some point detect failure over the first transit provider path 120. The failure can include any of not receiving an acknowledgement to the first packet, receiving an acknowledgement after a large delay, or receiving any error message or condition indicating a first transit provider path 120 failure (e.g., a message indicating the destination host is unreachable). The source network server 113 can attempt to resolve the error by sending a second packet, which could be a copy of the first packet, to the same destination network address with the second packet header ToS field set to a value of 1. Based on the second packet header ToS value of 1, the source network router 116 routes the second packet to the destination network 140 through the second transit provider path 125.

The source network server 113 can also select the third transit provider path 130 by setting the ToS field in the header of a third packet to a value of 2. Based on the configured ToS value to transit provider path mapping, the source network router 116 routes the third packet to the destination network 140 through the third path 130.

Such application controlled path selection is realized by way of a concerted set of configurations. In some embodiments, this includes configuring and implementing a first set of network or router level configurations on the routers and configuring and implementing a second set of application or server level configurations on the servers of the source network from which the packets are being sent to a destination network.

In accordance with some embodiments, the network or router level configurations configure the network routers with various policy-based routing (PBR) rules. In some embodiments, the PBR rules map a ToS value to a specific transit provider path. More specifically, the PBR rules map an address prefix or subnet and a DSCP value within an IP header DS field to a specific transit provider path. For instance, the PBR rules may map a particular ToS value and addresses within a first address subnet (e.g., 100.1.1.0/24) to a first transit provider path. The same PBR rules may map the same particular ToS value and addresses within a different second address subnet (e.g., 100.1.2.0/24) to a different second transit provider path. This allows the same set of ToS values to be used to designate different transit provider paths to different destination networks.

The application or server level configurations compliment the network or router level configurations. They do so by configuring the servers with policies for selecting a path prior to generating and submitting packets to the network routers for routing to an external network. Policies can be set so that a server selects the most efficient path to a destination network, provides some dynamic or consistent distribution of packets across available paths to a destination network, or bases the path selection determination on some specified criteria as some examples. The application or server level configurations also configure the servers with the ToS values or ToS values and address combinations assigned to the different paths. From these configured assignments or mappings, the servers can generate packets to specify the intended paths through which the packets are routed by the network routers.

Figure 2:
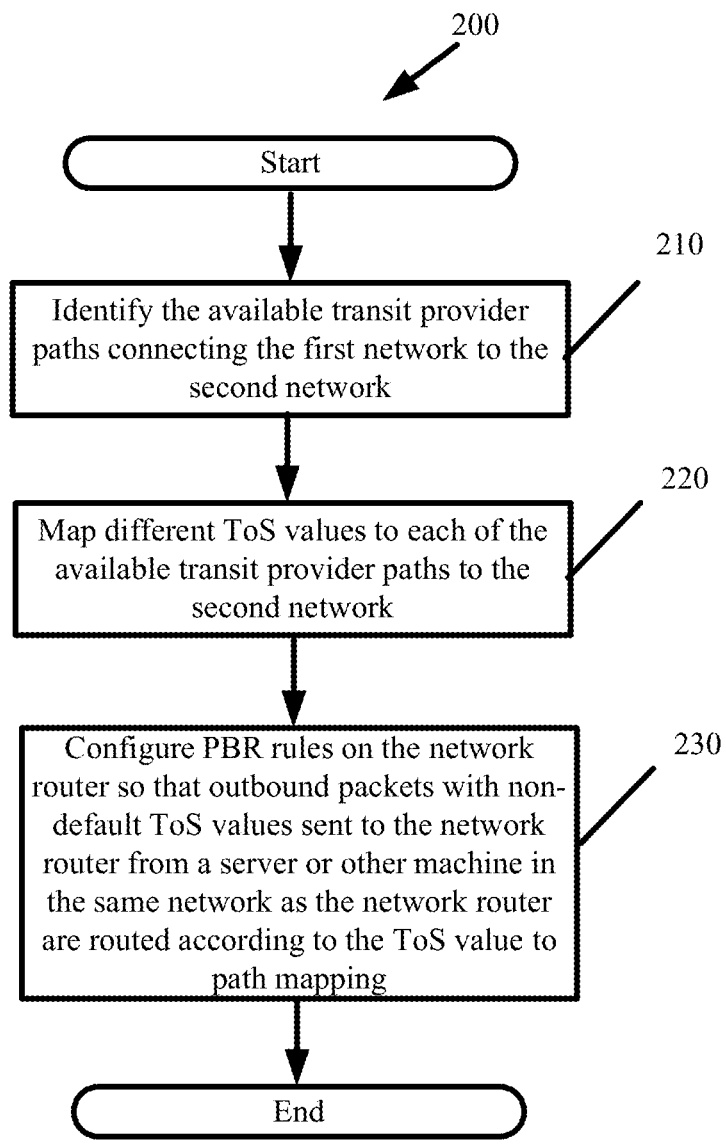
FIG. 2 presents a process describing the network or router level configurations controlling router operation in performance of the application controlled path selection of some embodiments.

FIG. 2 presents a process 200 describing the network or router level configurations controlling router operation in performance of the application controlled path selection of some embodiments. Process 200 is described in relation to a network router sending packets to an external second network in accordance with the application controlled path selection embodiments set forth herein.

The process 200 commences by identifying (at 210) two or more available transit provider paths connecting the first network to the second network. The process need not identify all transit provider paths between the first network and the second network. However, so long as two paths are identified, the application controlled path selection can be configured and performed. The first network and second network can be different autonomous systems, PoPs, subnets, or any other network nodes that communicate by way of an exterior gateway protocol, such as BGP.

Next, the process maps (at 220) different ToS values to each of the available transit provider paths to the second network. To differentiate the mapping of the same set of ToS values to transit provider paths to different external networks, the mapping at step 220 may involve assigning the second network address prefix or subnet to each ToS value that is assigned to each available transit provider path to the second network. The mappings are stored to a mapping table. In some embodiments, the mapping table is stored locally on the network router. The mapping table can also be stored remotely so that different routers operating within the same network can access the same mapping table.

Based on the ToS value to transit provider path mappings, the process then configures (at 230) PBR rules on the network router. The PBR rules control the routing operation of the network router and override standard BGP route selection so that outbound packets with non-default ToS values sent to the network router from a server or other machine in the same network as the network router are routed according to the ToS value to transit provider path mappings. In some embodiments, a non-default ToS value is any value other than 0. As noted above, a default or ToS value of 0 can also be mapped to a specific transit provider path.

Figure 3:
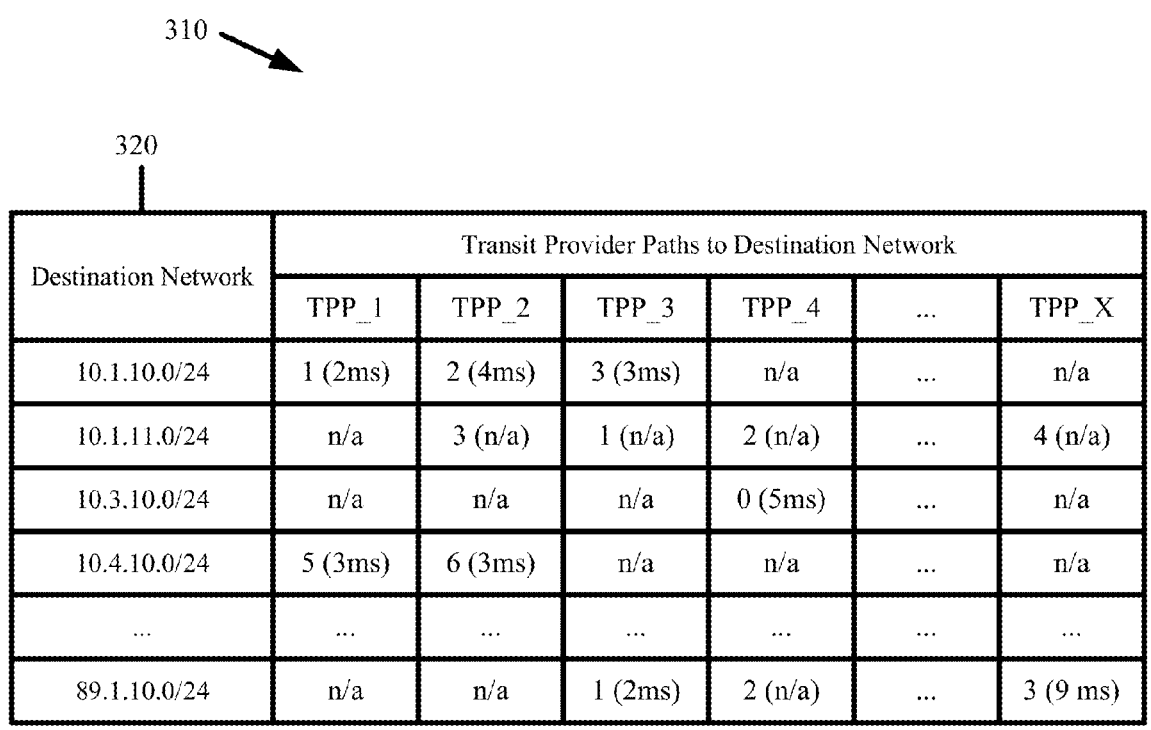
FIG. 3 conceptually illustrates a ToS value to transit provider path mapping table for implementing application or server controlled path selection in accordance with some embodiments.

FIG. 3 conceptually illustrates a ToS value to transit provider path mapping table 310 for implementing application or server controlled path selection in accordance with some embodiments. This exemplary mapping table 310 may be one that is configured on a network router as part of the network or router level configurations. For example, the mapping table 310 may be configured on the network router described with reference to FIG. 2. The mapping table 310 may also be illustrative of one that is configured on a server in a corresponding network as a network router that is also configured with the mapping table 310.

The table 310 includes ToS value to transit provider path mappings for different external networks. Specifically, the table 310 includes a first column 320 specifying different address prefixes or subnets for different destination networks. The table further includes columns for different transit provider paths. Any available paths of the transit providers that the first network can use to reach the different destination networks are identified with different ToS values. Optionally, performance metrics, such as latency measurements, may be provided to identify the performance of an available path to a destination network. As can be seen from the table 310, the same set of ToS values can be used to designate different transit provider paths to the different networks. Accordingly, in some embodiments, the ToS value to transit provider path mapping is actually a combined ToS value and address prefix or subnet mapping to different transit provider paths.

Figure 4:
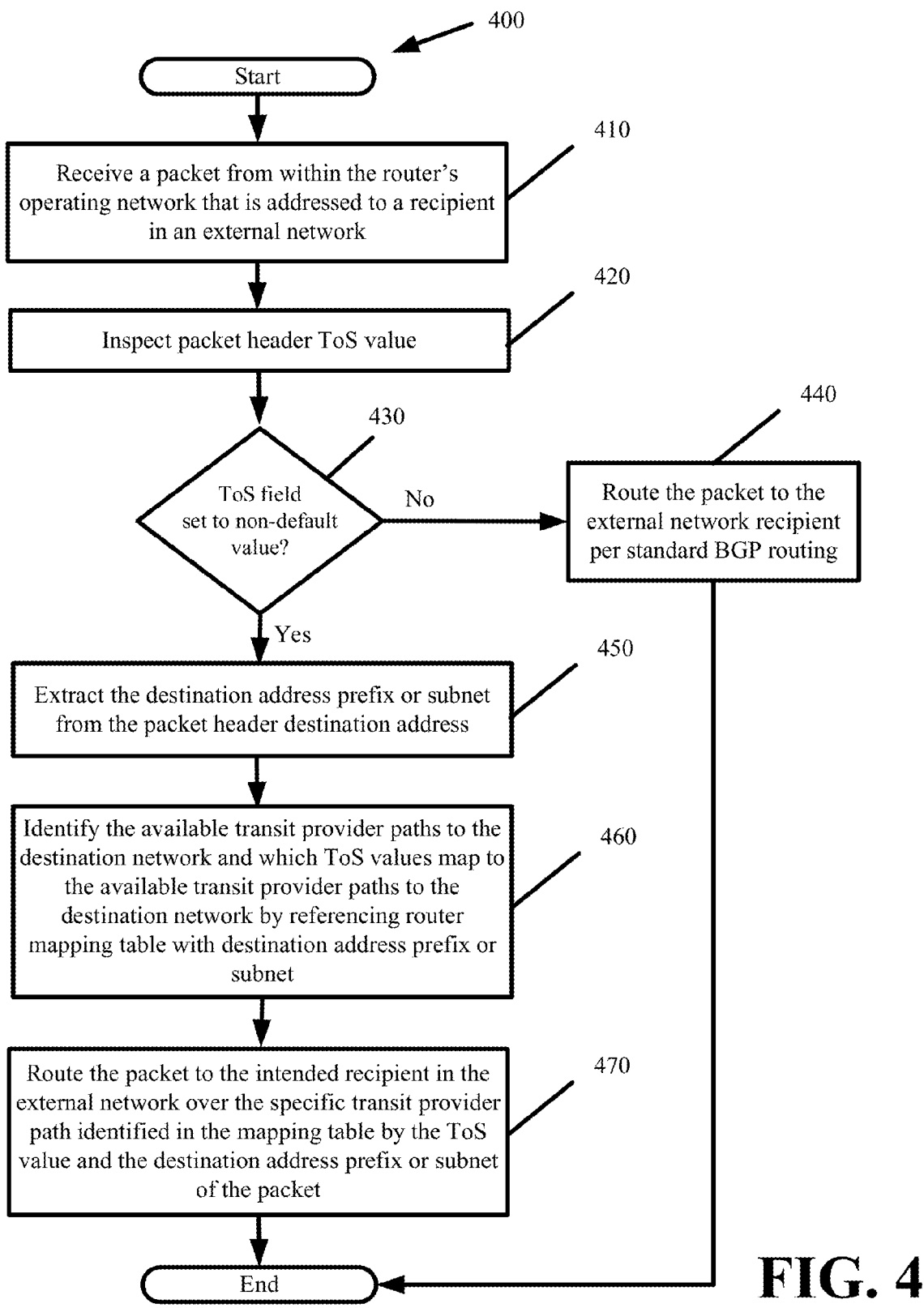
FIG. 4 presents a process describing network router operation in implementing the network or router level configurations for application controlled path selection in accordance with some embodiments.

FIG. 4 presents a process 400 describing network router operation in implementing the network or router level configurations for application controlled path selection in accordance with some embodiments. The network router operation involves using the ToS value to transit provider path mapping table to route a packet to its intended destination through a transit provider path that is selected by the server generating the packet.

The process 400 begins when the network router receives (at 410) a packet from within the router's operating network with the packet being addressed to a recipient in an external network. Such a packet is identified based on the packet header destination address providing an address that is in a different address prefix or subnet than the address prefix or subnet for the network in which the router operates.

The process inspects (at 420) the packet header ToS field to determine (at 430) if a non-default value is set (i.e., a non-zero value). When the packet header ToS field is not set with a ToS value or is set with a default ToS value, the process routes (at 440) the packet to the external network recipient either according to standard BGP routing or a configured default transit provider path. When routing the packet according to standard BGP routing, the router relies on networking protocols to determine and select which of one or more available transit provider paths to use in routing the packet to the destination network. In some cases where no ToS value or a default ToS value (i.e., a zero value) is specified, there may only be one path available for the source network router to route the packet to the destination network.

When the packet header ToS field is set with a non-default value, the network router performing process 400 extracts (at 450) the destination address prefix or subnet from the packet header destination address. Using the extracted destination address prefix or subnet, the process identifies (at 460) the available transit provider paths to the destination network as well as which ToS values map to the available transit provider paths to the destination network. This mapping is identified by referencing the router mapping table with the extracted destination address prefix or subnet. Based on the identification, the process then routes (at 470) the packet to the intended recipient in the external network through the specific transit provider path identified in the mapping table by the ToS value and the destination address prefix or subnet from the server created packet. The network router can route the packet over the specific transit provider path using the address of the next hop or next hop interface identifier in the specific transit path.

As noted above, the application controlled path selection embodiments presented herein involve concerted operation at the application or server level and the network or router level. Accordingly, some embodiments provide the application or server level configurations to compliment and build upon the network or router level configurations.

The application or server level configurations configure the servers to leverage the ToS value to transit provider path mappings put in place by the network or router level configurations for purposes of performing path selection at the application or server level. In some embodiments, the application or server level configurations include policies that specify a desired distribution through the available transit provider paths, or that alternatively specify how a server determines an optimal path from the available transit provider paths.

Figure 5:
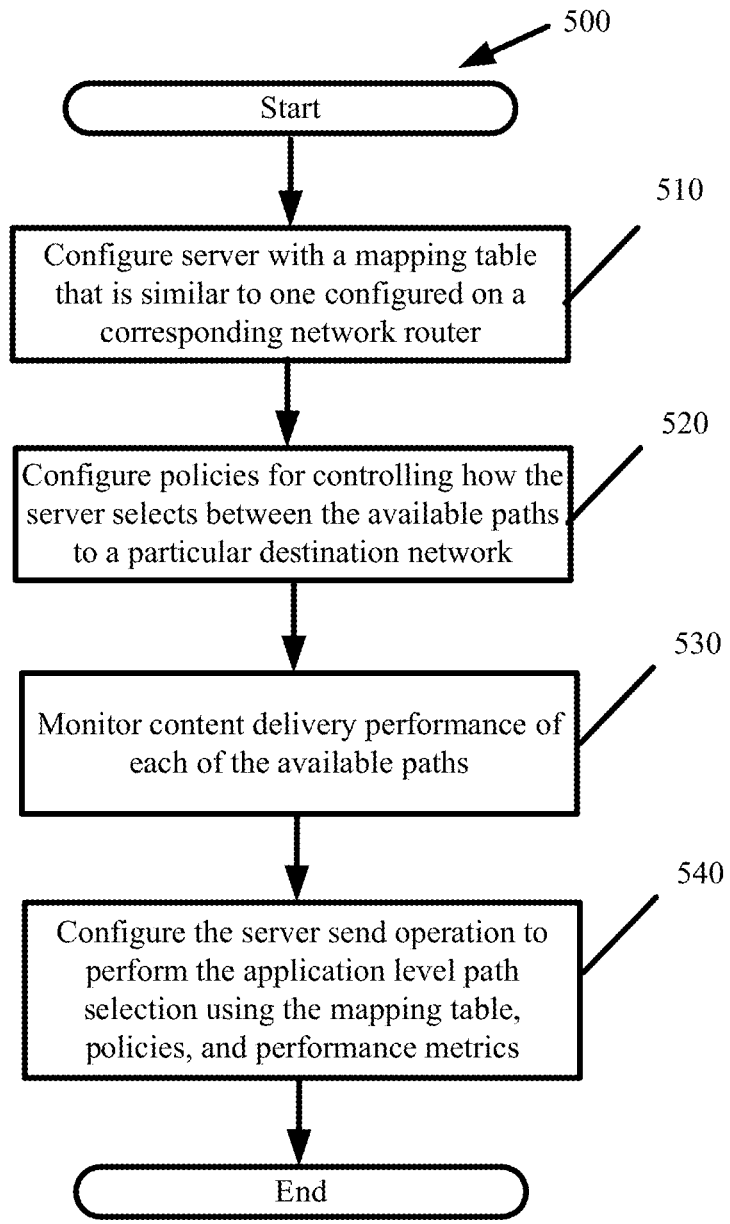
FIG. 5 presents a process describing the application or server level configurations controlling server operation in performance of the application controlled path selection of some embodiments.

FIG. 5 presents a process 500 describing the application or server level configurations controlling server operation in performance of the application controlled path selection of some embodiments. Process 500 is described in relation to configuring a server that operates in the same network as a network router configured according to process 200 above.

A first step in enabling the application controlled path selection operation at the server level is to configure (at 510) the server with a mapping table that is similar to the one configured on the network router. The mapping table identifies the identified and mapped available transit provider paths to different destination networks, the address prefixes or subnets for each of the different destination networks, and the mappings of the different ToS values to the different available transit provider paths to the destination networks. In other words, the same mapping table should be configured not only on the network router that routes the server's packets to external networks, but also the servers that operate within the same network and that rely on the network router for routing their packets to the external networks.

The process further involves configuring (at 520) policies for controlling how the server selects between the available paths to a particular destination network. The policies can select between available paths according to a round-robin distribution, load balancing distribution, failover distribution, least frequently used (LRU) distribution, most frequently used (MRU) distribution, heuristic based distribution, or other distributions. Path selection according to these policies is described in greater detail below.

As some of the policies base their path selection determination on the performance provided by each path from a set of available paths, the process may further include monitoring (at 530) the content delivery performance of each of the available paths. The monitoring can be passive or active.

Passive monitoring involves monitoring the performance of different transit provider paths based on traffic that a server sends for connections or sessions established over those paths. tcp_info is a socket option that provides the server with various performance metrics for traffic flows already being sent through those paths. The server can also leverage one or more monitoring tools to assist in gathering additional path performance metrics.

Active monitoring involves injecting special purposed packets periodically on each of the paths to determine path performance. This can involve sending Internet Control Message Protocol (ICMP) echo request packets or ping packets through the different paths and measuring path performance from those packets. Per Request for Comment (RFC) 1249, ICMP packets may be sent with any value in the ToS field. This allows the server to control which paths the ICMP packets are sent over and thereby monitor performance on each path. Other specially injected packets can also be used to measure path performance.

Path performance can include measuring latency, response time, packet loss, number of retransmissions, round trip times, jitter, bit rates, and the like occurring on a monitored path. The server can compare the performance of different paths against one or more performance thresholds or against one another in order to identify which of the paths is optimally performing.

Figure 6:
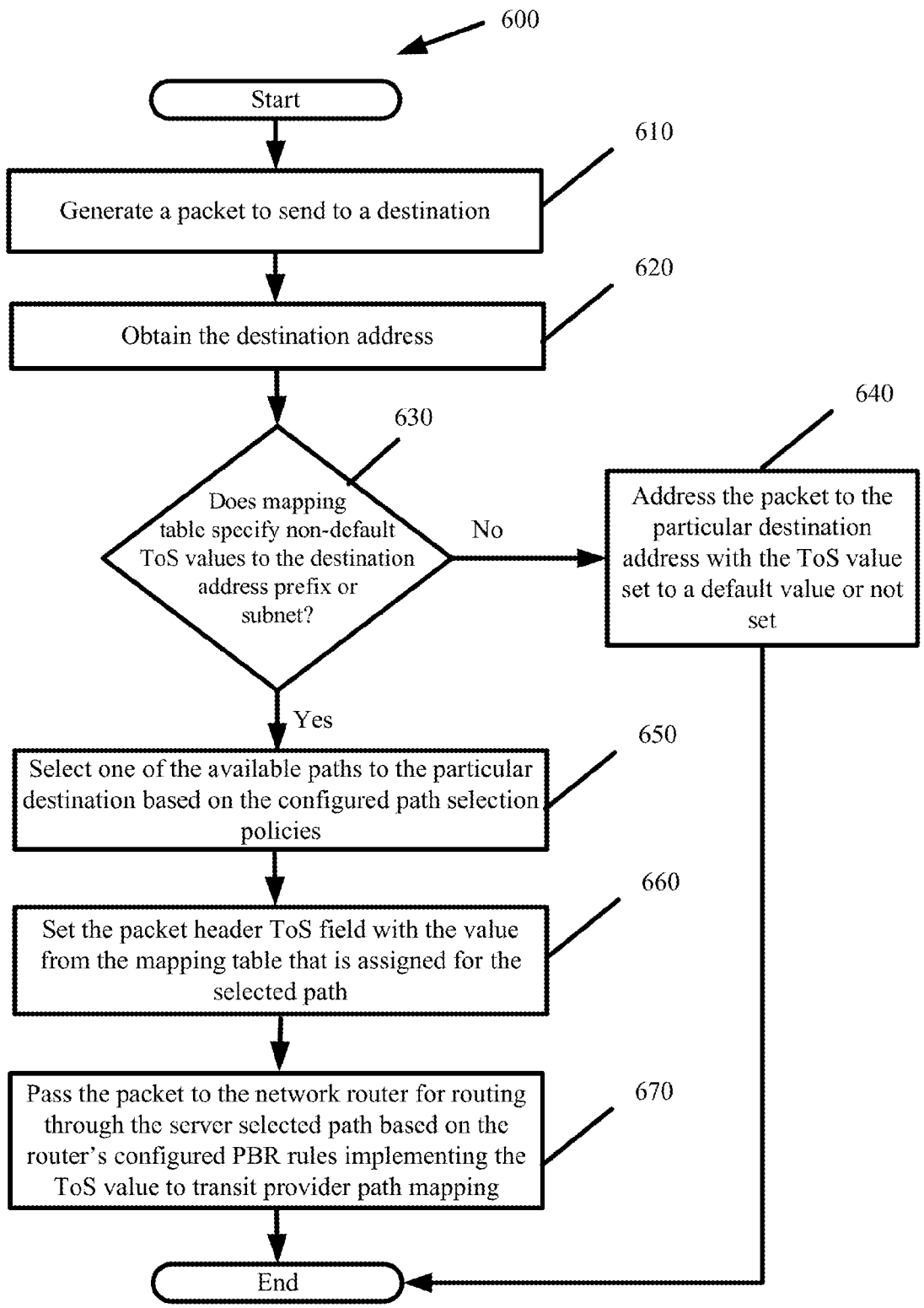
FIG. 6 presents a process describing server send operation in performing application controlled path selection using the application or server level configurations in accordance with some embodiments.

The process then involves configuring (at 540) the server send operation to perform the application level path selection using the mapping table, policies, and performance metrics and to populate ToS values for packets directed to recipients in external networks accordingly. FIG. 6 presents a process 600 describing server send operation in performing application controlled path selection using the application or server level configurations in accordance with some embodiments.

The process 600 commences when the server generates (at 610) a packet to send to a particular destination. The process obtains (at 620) the particular destination address. The particular destination address is typically either an IPv4 or IPv6 address and is obtained as a result of Domain Name System (DNS) resolution.

The process determines (at 630) if application level path selection is enabled for that particular destination by identifying whether the mapping table includes at least one non-default ToS value to the particular destination address prefix or subnet, with each different ToS value identifying a different transit provider path to the particular destination address prefix or subnet.

When the mapping table has no entry or only a default ToS value for the particular destination address prefix or subnet, the process continues by simply addressing (at 640) the packet to the particular destination address with the ToS value set to a default value or not set. The packet is then passed to the network router for routing to the destination. In this instance, the network router uses standard networking protocols to deliver the packet to the particular destination or a default path.

When the mapping table includes two or more ToS values that map to the particular destination, the server has multiple transit provider paths through which it may send the packet to the particular destination. Accordingly, the server selects (at 650) one of the available paths to the particular destination based on the configured path selection policies. The process then sets (at 660) the packet header ToS field with the value from the mapping table that is assigned for the selected path. The DSCP value within the IP header (i.e., the ToS value) may be set using the IP_TOS socket option in some embodiments. The process passes (at 670) the packet to the network router. The network router then routes the packet through the server selected path based on the router's configured PBR rules that implement the ToS value to transit provider path mapping.

The preferred embodiments have thusfar been described to make use of the ToS field for implementation of the application controlled path selection functionality. As used herein, the ToS field references the DS field of in an IP header with the ToS value representing the DSCP value in the DS field. However, some other embodiments implement the same functionality using other IP header fields or other protocol header fields. For example, the IP header options field can be used, instead of the ToS field, to specify which of several available transit provider paths to a destination the network router should use in routing a packet to that destination. Alternatively, the embodiments can be adapted such that the servers use the extension header fields of the IPv6 protocol in order to specify which of several available transit provider paths to a destination the network router should use in routing a packet to that destination. In still some other embodiments where routers parse transport layer (i.e., layer 4) or application layer (i.e., layer 7) headers, the servers could alternatively use header fields within the transmission control protocol (TCP), user datagram protocol (UDP), or hypertext transfer protocol (HTTP) in order to specify which of several available transit provider paths to a destination the network router should use in routing a packet to that destination As noted above, the application level configurations involve configuring policies that guide a server's path selection decision making. In some embodiments, the policies produce any of a round-robin distribution, load balancing distribution, failover distribution, least frequently used (LRU) distribution, most frequently used (MRU) distribution, heuristic based distribution, or more intelligent distributions of traffic across the available transit provider paths to an external network. The more intelligent distributions can select an optimal or desired transit provider path to a particular destination network based on criteria or performance metrics associated with each available path to the particular destination network, wherein the criteria or performance metrics include any of path performance, path cost, content quality-of-service, etc.

In some embodiments, a server configured with policies for a round-robin distribution establishes each new connection or session to a common destination over a next available transit provider path to that destination. Thus, all packets associated with a first established connection to the common destination have the ToS field set to a first value such that they are passed through a first path to the common destination and all packets associated with a second established connection to the common destination have the ToS field set of a second value such that they are passed through a different second path to the common destination.

In some embodiments, a server configured with policies for a load balanced distribution can establish new connections or sessions on a first path to a common destination until performance on that first path hits a specific threshold. Thereafter, the server establishes subsequent connections or sessions on a second path to the common destination, until again, performance on that second path hits a specified threshold.

In some embodiments, the policies implement a failover distribution. In some such embodiments, the server configured with the failover distribution policies sets a first value for the ToS field of outgoing packets to a common destination in order to select a first transit provider path until the first path fails or performance across that path falls below a defined threshold. When the first transit provider path experiences a failure or a drop in performance that causes performance to drop below a threshold, the server sets a second value for the ToS field of outgoing packets to the common destination in order to select a different second transit provider path. Subsequent traffic is passed to the destination along the second path for a specified time. After the specified time expires, the server can reselect the first path, resume setting the first value for the ToS field for packets of new connections to the common destination, and resume transmission across the first path unless the failure remains or performance remains below the threshold. If the first path continues underperforming, the server will reselect the second path and increase the specified time with which to resume sending traffic through the first path. Should the second path also fail or underperform, the server can select a third transit provider path to the common destination, if one is available, and pass traffic across the third path for the specified time or increased time if additional failures are detected across the second path. Some such embodiments have particular application to a multi-homed network in which a server or application attempts to contact a host. In such cases, the server can use a default path or first path in a first attempt to reach the host. The server can then attempt to resolve any failure preventing the server from contacting the host by changing the ToS or DSCP value of the created socket and retry contacting the host over a different path that PBR selects based on the different ToS or DSCP value.

In some embodiments, the application or server level configurations configure policies for maximizing content delivery performance to a destination. In some such embodiments and as noted above, the servers can be configured to passively or actively monitor performance across each of the available paths to a common destination. Based on the monitoring, the server identifies the path providing the best performance to the common destination and directs subsequent traffic intended for the common destination through the optimal path by setting the packet header ToS field value to the value assigned for the optimal path. The best performance can be determined based on one or more of path latency, packet loss, response time, number of retransmissions, round trip times, jitter, etc. If performance of a path is below a threshold, the server can select a different path. Alternatively, the server can compare the performance of each path to a given destination in order to identify the most optimal path.

Many of the above-described processes and components are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a hardware processor including cellular telephones, smartphones, portable digital assistants, tablet devices, laptops, notebooks, desktop computers, and networked computers. Examples of computer-readable media include, but are not limited to, CD-ROMs, flash drives, RAM chips, hard drives, EPROMs, etc.

Figure 7:
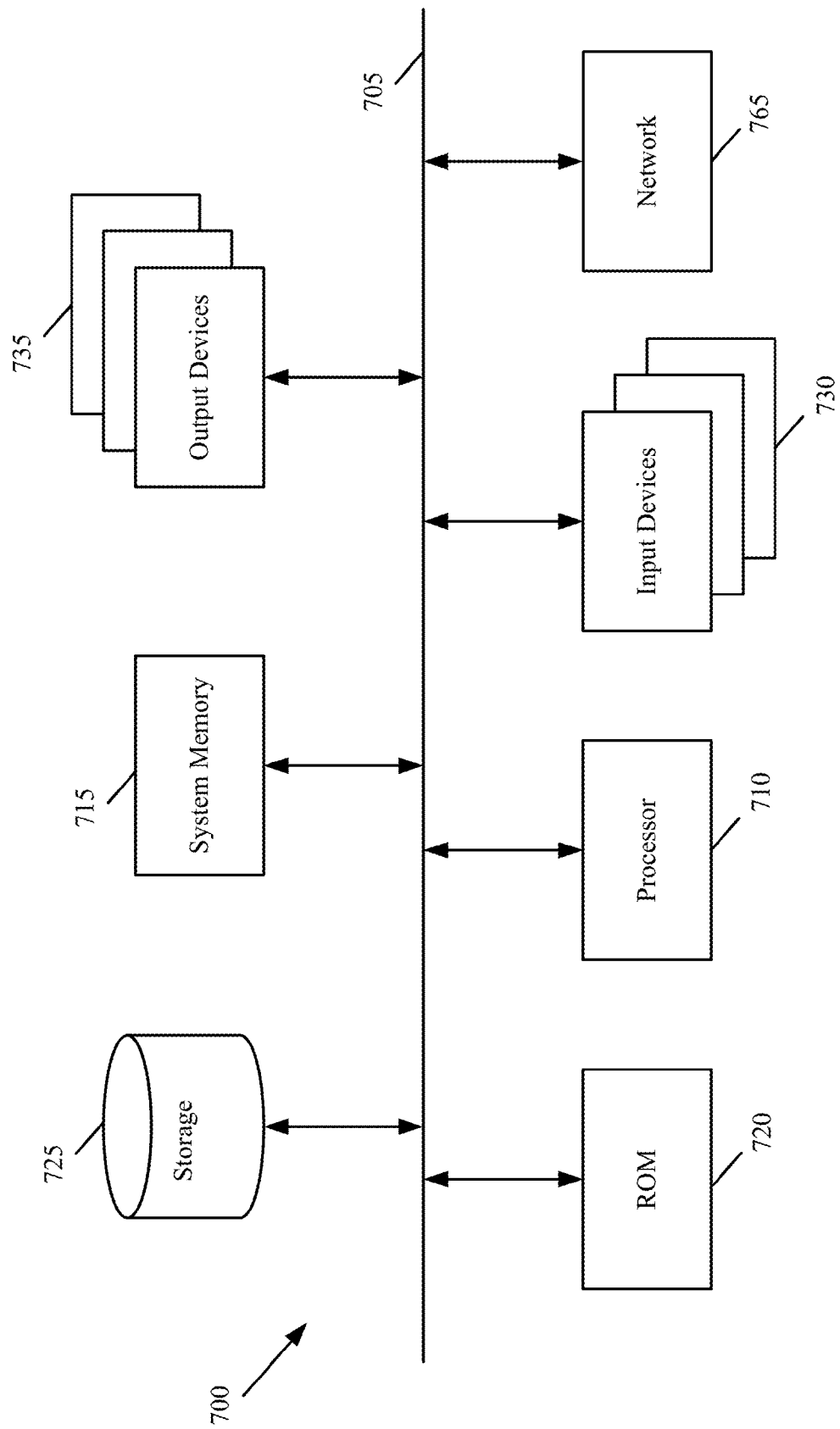
FIG. 7 illustrates a computer system or server with which some embodiments are implemented.

FIG. 7 illustrates a computer system or server with which some embodiments are implemented. Such a computer system includes various types of computer-readable mediums and interfaces for various other types of computer-readable mediums that implement the various methods and machines described above. Computer system 700 includes a bus 705, a processor 710, a system memory 715, a read-only memory 720, a permanent storage device 725, input devices 730, and output devices 735.

The bus 705 collectively represents all system, peripheral, and chipset buses that communicatively connect the numerous internal devices of the computer system 700. For instance, the bus 705 communicatively connects the processor 710 with the read-only memory 720, the system memory 715, and the permanent storage device 725. From these various memory units, the processor 710 retrieves instructions to execute and data to process in order to execute the processes of the embodiments described above. The processor 710 is a processing device such as a central processing unit, integrated circuit, graphical processing unit, etc.

The read-only-memory (ROM) 720 stores static data and instructions that are needed by the processor 710 and other modules of the computer system. The permanent storage device 725, on the other hand, is a read-and-write memory device. This device is a non-volatile memory unit that stores instructions and data even when the computer system 700 is off. Some embodiments use a mass-storage device (such as a magnetic, solid-state disk, or optical disk and its corresponding disk drive) as the permanent storage device 725.

Other embodiments use a removable storage device (such as a flash drive or solid-state disk) as the permanent storage device. Like the permanent storage device 725, the system memory 715 is a read-and-write memory device. However, unlike storage device 725, the system memory is a volatile read-and-write memory, such as random access memory (RAM). The system memory stores some of the instructions and data that the processor needs at runtime. In some embodiments, the processes are stored in the system memory 715, the permanent storage device 725, and/or the read-only memory 720.

The bus 705 also connects to the input and output devices 730 and 735. The input devices enable the user to communicate information and select commands to the computer system. The input devices 730 include alphanumeric keypads (including physical keyboards and touchscreen keyboards), pointing devices (also called "cursor control devices"). The input devices 730 also include audio input devices (e.g., microphones, MIDI musical instruments, etc.). The output devices 735 display images generated by the computer system. The output devices include printers and display devices, such as liquid crystal displays (LCD).

Finally, as shown in FIG. 7, bus 705 also couples computer 700 to a network 765 through a network adapter (not shown). In this manner, the computer can be a part of a network of computers (such as a local area network ("LAN"), a wide area network ("WAN"), or an Intranet, or a network of networks, such as the Internet.

As mentioned above, the computer system 700 may include one or more of a variety of different computer-readable media. Some examples of such computer-readable media include RAM, ROM, compact discs (CD-ROM), digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, and any other optical or magnetic media.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
identifying at a first network first server, a particular set of transit provider paths to a different second network from different sets of transit provider paths to a plurality of external networks based on an address with which the first network first server contacts a different second network second server, wherein the particular set of transit provider paths provide different sets of network hops or circuits connecting the first network first server to the second network second server;
mapping a different type-of-service (ToS) value to each transit provider path of the particular set of transit provider paths;
distributing a performance monitoring packet from the first network first server across each transit provider path of the particular set of transit provider paths based on said mapping, wherein said distributing comprises sending a plurality of performance monitoring packets to the address of the second network second server with different ToS values mapped to each path of the particular set of transit provider paths;
selecting at the first server, one of the particular set of transit provider paths to send a data packet from the first server to the second server based on said distributing of the performance monitoring packets from the first network first server across the particular set of transit provider paths;
generating at the first server, the data packet by setting the data packet destination address to the address of the second server and by further setting the data packet ToS to (i) a first non-default value in response to performance measured from a performance monitoring packet with the first non-default value exceeding performance measured from other performance monitoring packets of the plurality of performance monitoring packets, and (ii) a different second non-default value in response to performance measured from a performance monitoring packet with the second non-default value exceeding performance measured from other performance monitoring packets of the plurality of performance monitoring packets; and sending the data packet from the first server to the second network, wherein said sending comprises routing said data packet through a first set of network hops or network circuits forming the first transit provider path based on the first non-default value set as the data packet ToS and routing said data packet through a different second set of network hops or network circuits forming the second transit provider path based on the second non-default value set as the data packet ToS.

2. The method of claim 1, wherein said sending comprises sending the data packet to a router of the first network with said router routing the data packet through the first transit provider path when the data packet ToS is set with the first non-default value and routing the data packet though the second transit provider path when the data packet ToS is set with the second non-default value.

3. The method of claim 2, wherein said mapping comprises configuring policy based rules (PBR) on said router, the PBR rules identifying said mapping of different non-default ToS values to different transit provider paths of the particular set of transit provider paths.

4. The method of claim 3, wherein said configuring further comprises mapping a different non-default ToS value and an address prefix or subnet of the second network to each transit provider path of the particular set of transit provider paths.

5. The method of claim 1, wherein the first network is addressable with a first address prefix or subnet and the second network is addressable with a different second address prefix or subnet, and wherein an exterior gateway protocol routes packets between the first address prefix or subnet and the second address prefix or subnet.

6. The method of claim 1, wherein said mapping comprises mapping a first address prefix or subnet of the second network and the first non-default value to the first transit provider path and mapping a different second address prefix or subnet of a different third network and the first non-default value to a different transit provider path connecting the first network to the third network, wherein said different transit provider path is not a path in the particular set of transit provider paths.

7. The method of claim 1 further comprising monitoring performance of each path of the particular set of transit provider paths based on said distributing.

8. The method of claim 7, wherein said selecting comprises selecting a particular transit provider path from the particular set of transit provider paths providing latency to the second network that is less than latency of other transit provider paths from the particular set of transit provider paths as determined from said monitoring.

9. The method of claim 1, wherein said selecting comprises performing a distribution of data packets across the particular set of transit provider paths based on a set of policies configured on the first server, said set of policies providing any of a round-robin, least recently used (LRU), and most recently used (MRU) distribution across the particular set of transit provider paths.

10. The method of claim 1, wherein said selecting comprises failing over from the first transit provider path to the second transit provider path when the data packet specified with the first non-default value does not successfully route to the second network over the first transit provider path, and wherein failing over comprises modifying the data packet by changing from the first non-default value to the second non-default value.

11. The method of claim 1, wherein the data packet ToS is one of an Internet Protocol (IP) ToS header field or differentiated services field, and wherein the ToS value is a value set within the ToS header field or the differentiated services code point of the differentiated services header field.

12. A system comprising:
a first network addressable with addressing in a first address prefix or subnet, the first network comprising a first server and a first router, wherein the first server and the first router are configured with a mapping table mapping different Internet Protocol (IP) address and type-of-service (ToS) value combinations to different sets of transit provider paths through which a plurality of different external networks are reachable; and a second network separated from the first network and interconnected to the first network via a first set of the different sets of transit provider paths, the second network addressable with addressing in a second address prefix or subnet, wherein the first router routes a first packet addressed to an address in the second address prefix or subnet through a first path of the first set of paths based on a first value set in the first packet header ToS field by the first server;

wherein the first router routes a second packet addressed to an address in the second address prefix or subnet through a second path of the first set of paths based on a different second value set in the second packet header ToS field by the first server; and wherein the first router selects one of the first set of paths over which to send a third packet addressed to an address in the second address prefix or subnet with a third value set in the third packet header ToS field, and wherein the third value is a default value disassociated with any particular path of the first set of paths.

13. The system of claim 12 further comprising a third network separated from the first network and interconnected to the first network via a second set of the different sets of transit provider paths, wherein the third network is addressable with addressing in a third address prefix or subnet.

14. The system of claim 13, wherein the first router routes a fourth packet addressed to an address in the third address prefix or subnet through a first path of the second set of paths based on the first value set in the fourth packet header ToS field by the first server, and wherein the first router routes a fifth packet addressed to an address in the third address prefix or subnet through a second path of the second set of paths based on the second value set in the fifth packet header ToS field by the first server.

15. The system of claim 12, wherein each transit provider path of the first set of transit provider paths comprises a plurality of routers under control of a common entity, said routers for routing traffic between the first network and the second network.

16. The system of claim 12, wherein the first server selects the first path of the first set of paths by setting the first value in the first packet header ToS field, wherein the first server selects the second path of the first set of paths by setting the second value in the second packet header ToS field, and wherein the first server defers path selection to the first router by setting the third value in the second packet header ToS field.

17. A method for performing application level path selection with a server operating in a first network, the method comprising:
 identifying an address to a destination in an external second network;
 identifying a plurality of transit provider paths connecting said first network to the second network based on a prefix or subnet of said address mapping to a plurality of header values, wherein each header value of the plurality of header values uniquely identifies a different path from the plurality of transit provider paths;
 selecting at said server, a first path from the plurality of transit provider paths based on path selection criteria configured on said server;
 generating a first packet to send to the destination at said server, wherein generating the first packet comprises populating the first packet header with said address and a first header value from the plurality of header values identifying the first path selected from said selecting;
 sending the first packet from said server to a router of the first network for routing of the first packet to the second network through said first path as selected by the first header value;
 monitoring transmission of said first packet over the first path; and
 sending a second packet from said server to the destination based on said monitoring, wherein said sending the second packet comprises populating at said server, the second packet header with (i) said address and the first header value in response to the transmission of said first packet satisfying a performance threshold, and (ii) said address and a different second header value from the plurality of header values identifying a different second path from the plurality of transit provider paths in response to the transmission of said first packet not satisfying the performance threshold.

18. The method of claim 17 further comprising monitoring performance of each path of the plurality of transit provider paths, and wherein selecting the first path comprises selecting a path from the plurality of transit provider paths providing performance that is faster than performance of other paths of the plurality of paths as determined from said monitoring.

19. The method of claim 17, wherein populating the first packet header comprises populating one of the type-of-service field or differentiated services field of an Internet Protocol packet header with the first header value.

* * * * *